United States Patent [19]

Lee, Jr.

[11] 4,166,055
[45] Aug. 28, 1979

[54] COMPOSITION OF A POLYPHENYLENE ETHER, A BLOCK COPOLYMER OF A VINYL AROMATIC COMPOUND AND A CONJUGATED DIENE AND A POLYOLEFIN

[75] Inventor: Gim F. Lee, Jr., Albany, N.Y.

[73] Assignee: General Electric Company, Pittsfield, Mass.

[21] Appl. No.: 839,106

[22] Filed: Oct. 3, 1977

[51] Int. Cl.$^2$ ................... C08K 5/49; C09K 7/14; C09L 53/02
[52] U.S. Cl. ................... 260/30.6 R; 260/42.18; 525/92; 525/98
[58] Field of Search ........... 260/876 B, 42.18, 45.7 P, 260/30.6 R

[56] References Cited

U.S. PATENT DOCUMENTS

| | | | |
|---|---|---|---|
| 3,231,635 | 1/1966 | Holden | 260/880 |
| 3,251,905 | 5/1966 | Zelinski | 260/879 |
| 3,257,357 | 6/1966 | Stamatoff | 260/47 |
| 3,257,358 | 6/1966 | Stamatoff | 260/47 |
| 3,299,174 | 1/1967 | Kuhre et al. | 260/880 B |
| 3,306,874 | 2/1967 | Hay | 260/47 |
| 3,306,875 | 2/1967 | Hay | 260/47 |
| 3,333,024 | 7/1967 | Haefele et al. | 260/879 |
| 3,361,851 | 1/1968 | Gowan | 260/897 |
| 3,383,435 | 8/1968 | Cizek | 260/874 |
| 3,431,323 | 3/1969 | Jones | 260/880 |
| 3,465,063 | 9/1969 | Hassell et al. | 260/876 |
| 3,639,506 | 2/1972 | Haaf | 260/887 |
| 3,639,508 | 2/1972 | Kambour | 260/876 B |
| 3,670,054 | 6/1972 | De La Mare | 260/880 |
| 3,835,200 | 9/1974 | Lee, Jr. | 260/876 B |
| 3,994,856 | 11/1976 | Katchman | 260/876 B |

OTHER PUBLICATIONS

Kennedy et al, (Ed); "Polymer Chemistry of Synthetic Elastomers", Interscience Publishers, vol. 23, Part II, pp. 533-539 (1969).

Primary Examiner—J. Ziegler
Attorney, Agent, or Firm—Morgan, Finnegan, Pine, Foley & Lee

[57] ABSTRACT

There are provided compositions comprising a polyphenylene ether and a synergistic combination comprising an elastomeric block copolymer of a vinyl aromatic compound and a conjugated diene and a polyolefin resin, optionally containing a styrene homopolymer or random copolymer resin. The addition of the combination of elastomeric block copolymer resin and polyolefin resin to polyphenylene ethers or mixtures of polyphenylene ethers and such polystyrenes provides unexpected improvements in toughness in parts molded from the composition, in comparison with compositions containing either the block copolymer or the polyolefin resin alone.

19 Claims, No Drawings

4,166,055

COMPOSITION OF A POLYPHENYLENE ETHER, A BLOCK COPOLYMER OF A VINYL AROMATIC COMPOUND AND A CONJUGATED DIENE AND A POLYOLEFIN

This invention relates to novel resin compositions and more particularly, to polymer compositions comprising a polyphenylene ether, a combination comprising an elastomeric block copolymer of a vinyl aromatic compound and a conjugated diene and a polyolefin resin and, optionally, a polystyrene homopolymer or random copolymer resin.

BACKGROUND OF THE INVENTION

The polyphenylene ethers are known and described in numerous publications including Hay, U.S. Pat. Nos. 3,306,874 and 3,306,875 and Stamatoff U.S. Pat. Nos. 3,257,357 and 3,257,358. The high molecular weight polyphenylene ethers are high performance engineering thermoplastics possessing relatively high melt viscosities and softening points—i.e., in excess of 275° C., and are useful for many commercial applications requiring high temperature resistance including formation of films, fibers and molded articles.

Although they have the above-described desirable properties, it is also known that certain properties of the polyphenylene ether resins are undesirable for some commercial uses. For example, parts molded from the polyphenylene ethers are somewhat brittle due to poor impact strength. In addition, the relatively high melt viscosities and softening points are considered a disadvantage for many uses. Films and fibers can be formed from polyphenylene ether resins on a commercial scale using solution techniques, but melt processing is commercially unattractive because of the high temperatures required to soften the resin and the problems associated therewith such as instability, discoloration and the requirement for specially designed process equipment to operate at elevated temperatures. Molded articles can be formed by melt processing techniques, but, again, the high temperatures required are undesirable.

It is known in the art that properties of the polyphenylene ether resins can be materially altered by blending them with other resins. For example, in commonly-assigned patent, U.S. Pat. No. 3,361,851, a polyphenylene ether composition comprising a polyphenylene ether blended with a polyolefin is disclosed. The polyolefin is added to improve impact strength and resistance to aggressive solvents. In a second commonly assigned patent, Cizek, U.S. Pat. No. 3,383,435, there are provided means for simultaneously improving the melt processability of the polyphenylene ether resins while simultaneously up-grading many properties of polystyrene homopolymer and random copolymer resins. The invention of the Cizek patent is based upon the discovery that the polyphenylene ether resins and such polystyrene resins, including rubber modified polystyrene resins, are combinable in all proportions and result in compositions having many properties improved over those of either of the components. When polyethylene is incorporated in polyphenylene ether or in compositions thereof with styrene resins, melt flow and physical properties are markedly improved. The amount of polyolefin which can be incorporated is limited, however, to about 5 parts per hundred of resin, due to excessive delamination and accompanying brittleness.

It has also been disclosed, see commonly assigned U.S. Pat. No. 3,994,856 and application No. 387,588, filed Aug. 13, 1973 abandoned in favor of application Ser. No. 826,196, filed Aug. 19, 1977, that an elastomeric block copolymer of a vinyl aromatic compound (A) and $(A)^1$ and a conjugated diene (B), of the A—B—$A^1$ type, A and $A^1$ being the same or different, and the molecular weight of the center block being higher than that of the terminal blocks, or a hydrogenated derivative thereof, will impart unexpectedly high impact strengths and chemical resistance properties both to polyphenylene ether resins and compositions of polyphenylene ether resins and polystyrene homopolymer and random copolymer resins. These applications are incorporated herein by reference.

It has now been discovered that much higher amounts of polyolefin can be incorporated if a block copolymer is also incorporated in the composition. Most unexpected is a tremendous synergistic increase in Izod impact strength following use of the combination of polyolefin and block copolymer. A small amount of a plasticizer provides further enhancement of impact strength.

DESCRIPTION OF THE INVENTION

According to the present invention there are provided thermoplastic compositions, having high impact strength comprising (a) a polyphenylene ether resin or a composition comprising a polyphenylene ether resin and a styrene homopolymer or random copolymer resin and (b) a synergistic, impact strength improving combination comprising (i) an elastomeric block copolymer of a vinyl aromatic compound (A) and $(A)^1$ and a conjugated diene (B), of the A—B—$A^1$ type, the center block B being of higher molecular weight than that of the combined terminal blocks A and $A^1$ or a hydrogenated derivative thereof and (ii) a polyolefin resin, component (b) being present in an amount of from about 5 to about 30% by weight of the total resinous components of the composition.

Preferred compositions will be those in which the polyphenylene ether comprises at least 1% by weight of the total resinous components in the composition.

It is to be understood, however, that the present compositions can also include conventional amounts of conventional additives for processability, flame retardancy, stability and the like.

Among the features of this invention are reinforced compositions containing reinforcing amounts of reinforcements, such as powders, whiskers, fibers or platelets of metals, e.g., aluminum, bronze, iron or nickel, and non-metals, e.g., carbon filaments, acicular $CaSiO_3$, asbestos, $TiO_2$ titanate whiskers, glass flakes and fibers and the like. Such reinforcements will be present in an amount of, e.g., 2 to 90% by weight, preferably 10 to 60% by weight. Especially preferred as a reinforcement is fibrous glass.

In preferred compositions the polyphenylene ether resins in component (a) will be those having repeating structural units of the formula

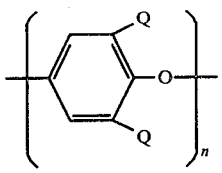

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and phenyl nucleus. The preparation of polyphenylene ether resins corresponding to the above formula is described in the above-mentioned patents of Hay and Stamatoff. Especially preferred polyphenylene ether resins for purposes of the present invention are those having alkyl substitution in the two positions ortho to the oxygen ether atom—i.e., where each Q is alkyl, most preferably, having from 1 to 4 carbon atoms. The most preferred polyphenylene ether resin for purposes of the present invention is poly(2,6-dimethyl-1,4-phenylene)ether (each Q is methyl).

The block copolymers of a vinyl aromatic hydrocarbon and a diene hydrocarbon (b) (i) are well known in the art and commercially available. These are described, for instance, in "Polymer Chemistry of Synthetic Elastomers", edited by Kennedy et al, Interscience Publishers, Vol. 23, Part II (1969), pages 553–559, the disclosure of which is incorporated herein by reference. Other descriptions are given in Zelinski, U.S. Pat. No. 3,251,905, and Holden et al, U.S. Pat. No. 3,231,635 which are also incorporated herein by reference.

In general, component (b) (i) is a block copolymer of the A—B—A type in which terminal blocks A, which can be the same or different, are thermoplastic homopolymers or copolymers prepared from a vinyl aromatic compound wherein the aromatic moiety can be either mono- or polycyclic. Examples include styrene, alpha-methyl styrene, vinyl toluene, vinyl xylene, ethyl vinyl xylene, vinyl napththalene and the like, or mixtures thereof.

Center block B is an elastomeric polymer derived from a diene hydrocarbon, preferably a conjugated diene, e.g., 1,3-butadiene, 2,3-dimethyl butadiene, isoprene, 1,3-pentadiene, and the like, or mixtures thereof.

The ratio of the copolymers and the average molecular weights of each can vary broadly. Frequently however, the molecular weight of center block B will be greater than that of the continued terminal blocks, which appear to be necessary for optimum impact strength and solvent resistance. The molecular weight of terminal block A will preferably range from about 2,000 to about 100,000, while the molecular weight of center block B is preferably from about 25,000 to about 1,000,000.

If desired, the block copolymers can be post-treated to hydrogenate the rubber portion of the copolymer.

Hydrogenation can be carried out in a variety of hydrogenate catalysts, such as nickel on Kieselguhr, Runey nickel copper chromate, molybdenum sulfide and finely divided platinum or other nobel metals on a low surface area catalyst.

Hydrogenation can be conducted at any desired temperature or pressure, e.g., from atmospheric to 3,000 p.s.i.g., usually between 100 and 1,000 p.s.i.g., and at temperatures between 75° to 600° F., for times ranging between 0.1 and 24 hours, preferably from 0.2 to 8 hours.

With respect to the hydrogenated A—B—A block copolymers, it is preferred to form terminal block A having average molecular weight of from about 4,000 to about 115,000 and center block B having an average molecular weight of from about 20,000 to about 450,000. Still more preferably, the terminal block A will have an average molecular weight of from 8,000 to 60,000 while center block B sill have an average molecular weight of from 50,000 to 300,000.

The terminal block will also preferably comprise from 2 to 33% by weight, more preferably from 5 to 30% by weight, based on the total weight of the block copolymer (b) (i).

Especially preferred hydrogenated block copolymers are those having a polybutadiene center block wherein from 35 to 55%, more preferably from 40 to 50% of the butanediene carbon atoms are vinyl side chains.

The hydrogenated block copolymers are described further in Jones, U.S. Pat. No. 3,431,323 and De LaMare et al, U.S. Pat. No. 3,670,054, both of which are incorporated herein by reference.

In preferred compositions, component (b) (i) will be an A—B—A block copolymer of the polystyrene-polybutadiene-polystyrene or polystyrene-polyisoprene-polystyrene type wherein the polybutadiene or polyisoprene portion can be either hydrogenated or non-hydrogenated.

As noted above, the polyolefin resin can include polyethylene, polypropylene, copolymers of ethylene and propylene, polyisobutylene, and the like. They are commercially available or can be prepared by methods well known to those skilled in the art. Polyethylene is preferred. The amounts of (b), the synergistic combination, will generally vary between 5 and 25% by weight of the total resinous components of the composition. The upper limit is determined in each case by checking to see that the additive does not segregate out into a separate phase during molding. Too much will end in delamination and a tendency to weaken the molded work pieces.

In a preferred feature, a plasticizer will be included with the composition of polyphenylene ether, block copolymer and polyolefin resin. The plasticizer appears to enhance mixing and prevents preferential association of regions of the same polymer. Generally, any plasticizer which is compatible with both polyphenylene ether, block copolymer and polyolefins may be used. Typical examples of suitable plasticizers are chlorinated biphenols, mineral oil, phosphates, and the like. Preferably, triphenyl phophate will be used.

The amount of plasticizer should be kept at a level which will not unduly diminish properties of the polymer, i.e., rigidity, heat distortion, etc. In general up to about 25% of plasticizer based on total resinous components will be used.

As noted above, the elastomeric block copolymer and the polyolefin resin may be added to a polyphenylene ether resin or to a composition of a polyphenylene ether resin with an additional resin, preferably a polystyrene homopolymer or random copolymer resin and most preferably, a high impact polystyrene resin. As disclosed in the above-mentioned Cizek patent, the styrene resin most readily combinable with the polyphenylene ether resin is one having at least 25% by weight polymer units derived from vinyl aromatic monomer having the formula

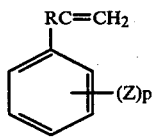

where R is hydrogen, alkyl of 1 to 4 carbon atoms or halogen; Z is a member selected from the class consisting of vinyl, hydrogen, or alkyl of from 1 to 4 carbon atoms; and p is from 1 to 5. Such compositions will comprise from 1 to 99% by weight of the polyphenylene ether component and from 99 to 1% by weight of the polystyrene resin. The preferred styrene resin for purposes of this invention is one comprising either a styrene homopolymer or a rubber modified polystyrene, e.g., blended or grafted with from about 3 to 30, preferably from 4 to 12% by weight of a polybutadiene or a rubbery random copolymer, e.g., of about 70% BD and 30% styrene.

The amount of elastomeric block copolymer and polyolefin resin added to the polyphenylene ether resin or composition thereof with polystyrene may vary within rather broad limits, but preferably ranges from about 5 to 30% by weight of the resinous components.

In a preferred family of compositions the polyphenylene ether comprises from about 1 to about 90% by weight, the elastomeric block copolymer of a vinyl aromatic compound and a conjugated diene, or hydrogenated derivative thereof, and polyolefin resin comprises from about 5 to about 30% by weight, and the sytrene homopolymer or random copolymer resin component comprises from 0 to the remainder by weight of the total weight of the resinous components in said composition. Especially preferred are compositions in which the polyphenylene ether is poly(2,6-dimethyl-1,4-phenylene)ether and comprises from about 20 to about 90% by weight, component (b) (i) is an elastomeric block copolymer of styrene and butadiene of the poly(styrenebutadiene-styrene) type or a hydrogenated derivative thereof, (b) (i) is polyethylene and (b) (i) and (ii) together comprise from about 5 to about 30% by weight and the styrene homopolymer or random copolymer resin component is a rubber modified polystyrene and comprises from 0 to up to about 60% by weight of the total weight of the resinous components in the composition.

It should be obvious that other additives may be present in the compositions such as pigments, flame retardants and stabilizers in amounts varying between about 1 and 30 percent by weight of the total composition. The above-stated range for the elastomeric block copolymer resin, the polyolefin resin the polyphenylene ether resin, and, if present, the polystyrene resin, is based solely upon such resinous components in the polymer blend and excludes other additives.

The method of forming the polymer composition is not critical, prior art blending techniques being suitable. The preferred method comprises blending the polymers and additives, such as reinforcements in powder, granular and filamentous form—as the case may be—extruding the blend and chopping into pellets suitable for molding to shape by means conventionally used to mold normally solid thermoplastic compositions.

DESCRIPTION OF THE PREFERRED EMBODIMENTS

The advantages obtained by providing compositions of an elastomeric vinyl aromatic, conjugated diene A—B—A$^1$ block copolymer resin and polyolefin with a polyphenylene ether resin alone or in combination with another resin are illustrated in the following examples which are set forth as further description of the invention, but are not to be construed as limiting the invention thereto.

EXAMPLES 1 and 2

The formulations are mechanically blended then coextruded in a 28 mm Werner-Pfleiderer-twin screw extruder and molded into test pieces in a 3 oz. Newbury injection molding machine.

The molded articles are subjected to standard testing. The formulations and properties are set forth in Table 1:

Table 1

| Compositions of Polyphenylene Ether Rubber-Modified Polystyrene, A-B-A Block Copolymer and Polyolefin | | | | |
|---|---|---|---|---|
| Example | 1 | 2 | 1A* | 2A* |
| Composition (parts by wt.) | | | | |
| Poly(2,6-dimethyl-1,4-phenylene ether$^a$ | 80 | 80 | 80 | 80 |
| Rubber modified polystyrene$^b$ | 20 | 20 | 20 | 20 |
| Styrene-butadiene-styrene block copolymer$^c$ | 5 | 5 | 5 | — |
| Polyethylene$^d$ | 3 | 3 | — | 3 |
| Triphenyl phosphate (plasticizer) | — | 2 | — | — |
| Properties | | | | |
| Tensile yield, psi | 9,800 | 9,800 | 11,500 | 11,900 |
| Izod impact, ft.lbs./in. notch | 11.6 | 13.4 | 2.4 | 1.1 |
| Gardner impact, in.-lbs. | 250 | 270 | 300 | 73 |

*Control
$^a$PPO, General Electric Co.
$^b$Polystyrene-butadiene graft 834, Foster Grant
$^c$Kraton G6521, Shell Polymers Co.
$^d$AC1702, Allied Chemical Co.

The use of a combination of block copolymer and polyolefin is seen to cause a synergistic increase in notched Izod impact strength.

EXAMPLES 3-5

The general procedure of Examples 1 and 2 is repeated with a high loading of plasticizer and no rubber modified polystyrene. The formulation and properties are set forth in Table 2:

Table 2

| Compositions of Polyphenylene Ether, Plasticizer, A-B-A Block Copolymer And Polyolefin Resin | | | | |
|---|---|---|---|---|
| Example | 3A* | 3 | 4 | 5 |
| Composition (parts by wt.) | | | | |
| Poly(2,6-dimethyl-1,4-phenylene ether$^a$ | 78 | 78 | 78 | 78 |
| Triphenyl phosphate (plasticizer) | 22 | 22 | 22 | 22 |
| Styrene-butadiene-styrene block copolymer$^b$ | — | 15 | 15 | 10 |
| Polyethylene | 7.5 | 7.5 | 10 | 7.5 |
| Properties | | | | |

Table 2-continued
Compositions of Polyphenylene Ether,
Plasticizer, A-B-A Block Copolymer
And Polyolefin Resin

| Example | 3A* | 3 | 4 | 5 |
|---|---|---|---|---|
| Tensile elongation, % | 19 | 84 | 79 | 66 |
| Izod impact, ft.-lbs./in.notch | 2.0 | 21.0 | 21.3 | 22.8 |
| Gardner impact, in.-lbs. | <10 | 161 | 162 | 182 |

*Control
[a] PPO, General Electric Co.
[b] Hydrogenated B block, Kraton KG6521, Shell Polymers It is seen that high amounts of polyolefin can be incorporated without embrittlement if the hydrogenated A—B—A block copolymer is also incorporated.

EXAMPLES 6-8

The general procedure of Examples 1-2 is repeated, substituting an A—B—A block copolymer that is not hydrogenated. The formulations and properties are set forth in Table 3:

Table 3
Compositions of Polyphenylene Ether,
Rubber Modified Polystyrene, Plasticizer,
A-B-A Block Copolymer and Polyolefin Resin

| Example | 6A* | 6 | 7 | 8 |
|---|---|---|---|---|
| Composition (parts by wt.) | | | | |
| Poly(2,6-dimethyl-1,4-phenylene)ether[a] | 35 | 35 | 35 | 35 |
| Rubber modified polystyrene[b] | 65 | 65 | 65 | 65 |
| Triphenyl phosphate (plasticizer) | 8 | 8 | 8 | 8 |
| Styrene-butadiene-styrene block copolymer[c] | — | 15 | 15 | 15 |
| Polyethylene | 5 | 5 | 10 | 15 |
| Properties | | | | |
| Tensile yield, psi | 6,300 | 5,800 | 5,400 | 4,900 |
| Tensile strength, psi | 6,200 | 6,000 | 5,800 | 5,200 |
| Elongation, % | 47 | 79 | 80 | 56 |
| Izod impact, ft.-lbs./in.notch | 4.4 | 10.3 | 10.7 | 10.6 |
| Gardner impact, in.-lbs. | 10 | 202 | 151 | 135 |
| Flexural modulus, psi | 290,000 | 246,000 | 228,000 | 203,000 |
| Flexural strength, psi | 7,200 | 6,800 | 6,300 | 5,900 |

*Control
[a] PPO, General Electric Co.
[b] FG 834, Foster Grant Co.
[c] Kraton K1011, Shell Polymers Co., not hydrogenated It is seen that the present invention permits the use of large amounts of polyolefin without detrimental loss of impact properties.

Obviously, other modifications and variations of the present invention are possible in light of the above teachings. It is, therefore, to be understood that changes may be made in the particular embodiments of the invention described which are within the full intended scope of the appended claims.

I claim:
1. A thermoplastic composition, having high impact strength, comprising
(a) a polyphenylene ether resin or a composition comprising a polyphenylene ether resin and a styrene homopolymer or random copolymer resin and
(b) a synergistic, impact strength-improving combination comprising (i) an elastomeric, hydrogenated block copolymer of a vinyl aromatic compound (A) and (A)¹ and a conjugated diene (B), of the A—B—A¹ type, the center block B being of higher molecular weight than that of the combined terminal blocks A and A¹ and (ii) a polyolefin resin, component (b) being present in an amount of from about 5 to about 30% by weight of the total resinous components of the composition.

2. A composition as defined in claim 1 wherein component (a) is a polyphenylene ether of the formula

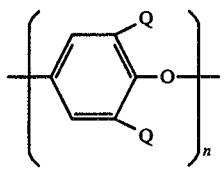

wherein the oxygen ether atom of one unit is connected to the benzene nucleus of the next adjoining unit; n is an integer of at least 50; and each Q is a monovalent substituent selected from hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

3. A composition as defined in claim 2 wherein each Q is alkyl having from 1 to 4 carbon atoms.

4. A composition as defined in claim 2 wherein each Q is methyl.

5. A composition as defined in claim 2 wherein said polyphenylene ether comprises at least 1% by weight of the total resinous components in said composition.

6. A composition as defined in claim 1 wherein, in component (b) (i), (A) and (A)¹ are selected from styrene, α-methyl styrene, vinyl toluene, vinyl xylene and vinyl naphthalene and (B) is selected from butadiene, isoprene, 1,3-pentadiene or 2,3-dimethylbutadiene.

7. A composition as defined in claim 6 wherein, in component (b) (i), (A) is a styrene block, (B) is a butadiene block and (A)¹ is a styrene block.

8. A composition as defined in claim 7 wherein, in component (b) (i), terminal blocks A and A¹ have molecular weights of 2,000 to 100,000, respectively, and center block B has a molecular weight of from 25,000 to 1,000,000.

9. A composition as defined in claim 1 wherein component (b) (i) has been hydrogenated to reduce the unsaturation of block B to less than 10% of the original unsaturation.

10. A composition as defined in claim 1 wherein polyolefin component (b) (ii) is polyethylene, a copolymer of ethylene and propylene, polypropylene, polyisobutylene, or a mixture of any of the foregoing.

11. A composition as defined in claim 10 wherein polyolefin component (b) (ii) is polyethylene.

12. A composition as defined in claim 1 wherein component (a) comprises
(i) from 1 to 99% by weight of a polyphenylene ether of the formula

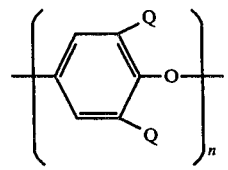

where Q is alkyl of from 1 to 4 carbon atoms and n is an integer of at least 50 and (ii) from 99 to 1% by weight of a styrene homopolymer or random copolymer resin having at least 25% of the polymer units derived from a vinyl aromatic compound of the formula

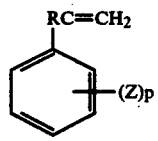

wherein R is hydrogen, alkyl of from 1 to 4 carbon atoms or halogen, Z is hydrogen, alkyl of from 1 to 4 carbon atoms or vinyl and p is 0 or an integer of from 1 to 5.

13. A composition as defined in claim 12 wherein the styrene resin is a styrene homopolymer resin or a rubber modified styrene resin, said rubber comprising a diene rubber or a rubbery copolymer of butadiene and styrene in an amount of from about 4 to about 12% by weight of said resin.

14. A composition as defined in claim 12 wherein the polyphenylene ether is poly(2,6-dimethyl-1,4-phenylene)ether.

15. A composition as defined in claim 1 wherein the polyphenylene ether comprises from about 1 to about 90% by weight, the synergistic combination (b) comprising (i) an elastomeric, hydrogenated block copolymer of a vinyl aromatic compound and a conjugated diene and (ii) a polyolefin resin comprises from about 5 to about 30% by weight, and the styrene homopolymer or random copolymer resin component comprises from 0 to the remainder by weight of the total weight of the resinous components in said composition.

16. A composition as defined in claim 15 wherein said polyphenylene ether is poly(2,6-dimethyl-1,4-phenylene)ether and comprises from about 20 to about 90% by weight, component (b)(i) is an elastomeric, hydrogenated block copolymer of styrene and butadiene of the poly(styrene-butadiene-styrene) type and (ii) is polyethylene, and (b)(i) and (ii) comprise from about 5 to about 30% by weight and the styrene homopolymer or random copolymer resin component is a homopolystyrene or a rubber modified polystyrene and comprises up to about 60% by weight of the total weight of the resinous components in said composition.

17. A composition as defined in claim 1 including up to about 25% by weight of a plasticizer.

18. A composition as defined in claim 17 wherein said plasticizer is triphenyl phosphate.

19. A reinforced composition as defined in claim 1 including a reinforcing amount of fibrous glass.

* * * * *